April 25, 1944. J. W. DROLL 2,347,314
WHEELBARROW
Filed Dec. 15, 1941 2 Sheets-Sheet 1
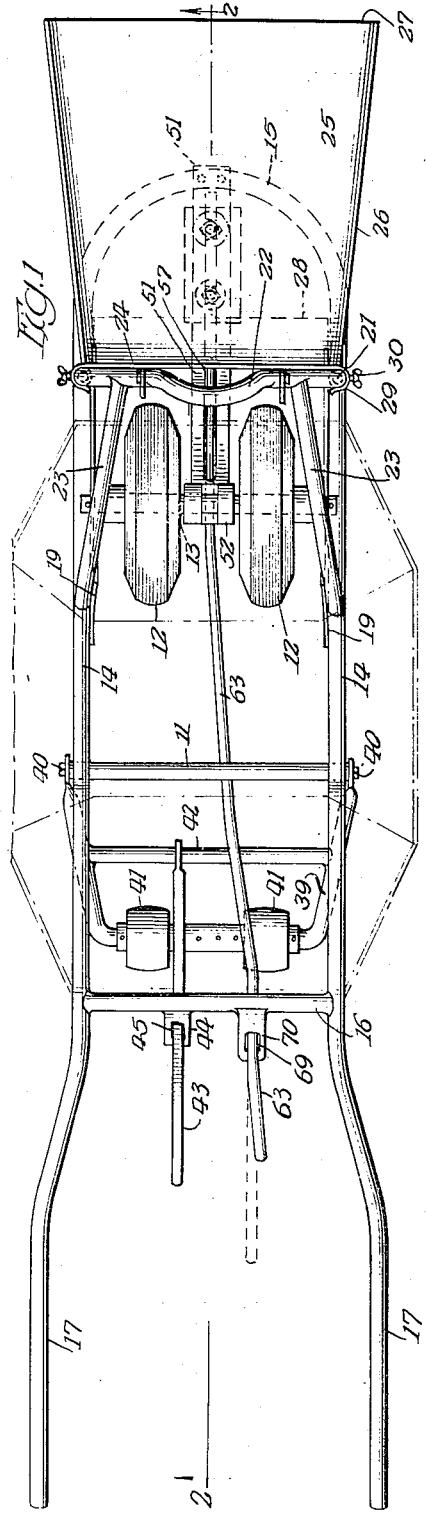
Inventor
Joseph W. Droll
By Fred Gerlach
Atty.

April 25, 1944.  J. W. DROLL  2,347,314
WHEELBARROW
Filed Dec. 15, 1941  2 Sheets-Sheet 2
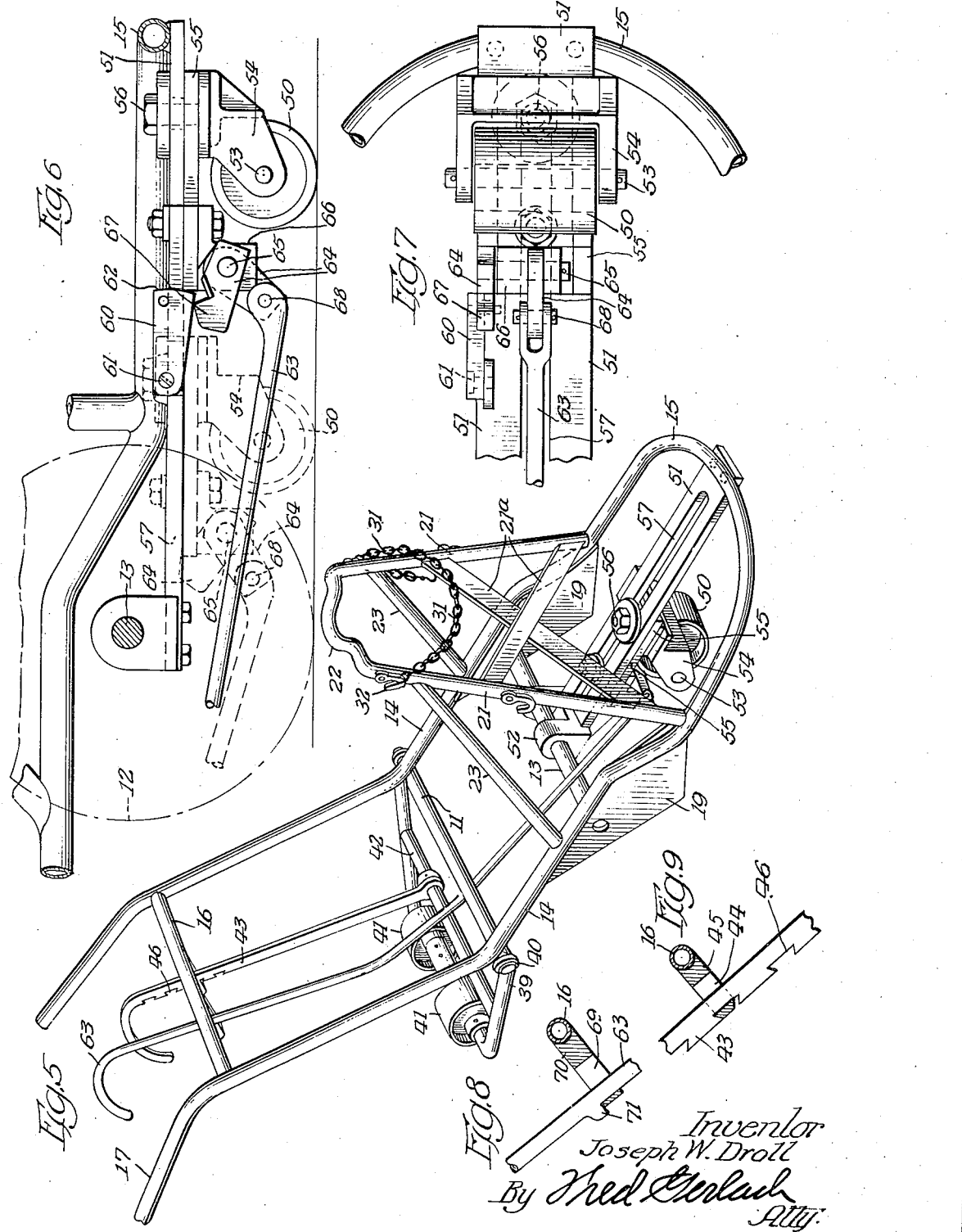
Inventor
Joseph W. Droll
By Fred Gerlach
Atty.

Patented Apr. 25, 1944

2,347,314

UNITED STATES PATENT OFFICE 2,347,314

WHEELBARROW

Joseph W. Droll, Wilmette, Ill.

Application December 15, 1941, Serial No. 422,939

8 Claims. (Cl. 214—65)

The invention relates to wheelbarrows.

One object of the invention is to provide a wheelbarrow which comprises a frame extending fore and aft of the axis of the carrying-wheel and is provided with a low supporting platform in front of the wheel which can be tilted to bring its front edge on or in close proximity to the ground, so that heavy loads may be conveniently moved onto and off the platform.

Another object of the invention is to provide an improved wheelbarrow, which comprises a load-carrying platform or support in front of the main carrying-wheel and an auxiliary roller or wheel forwardly of the axis of the main carrying-wheel, which is longitudinally adjustable so it can be shifted to supplement the supporting of the load on the platform and rearwardly so the frame and platform can fulcrum thereon so that the front edge of the platform can be lowered onto the ground for loading.

Another object of the invention is to provide a wheelbarrow which is equipped with a main carrying-wheel and with means for adjustably supporting the rear portion of the frame while a load is being transported and also so it can be raised away from the ground when its use is not desired.

Other objects of the invention will appear from the detailed description.

The invention consists in the several novel features which are hereinafter set forth and are more particularly defined by claims at the conclusion hereof.

In the drawings: Fig. 1 is a plan view of a wheelbarrow embodying the invention, the holder for bulk material being shown in dotted lines. Fig. 2 is a central longitudinal section taken on line 2—2 of Fig. 1. Fig. 3 is a section taken on line 3—3 of Fig. 2. Fig. 4 is a section taken on line 4—4 of Fig. 2. Fig. 5 is a perspective of the wheelbarrow frame and the auxiliary rollers mounted thereon. Fig. 6 is a detail illustrating the locking-means for the longitudinally adjustable auxiliary front roller. Fig. 7 is a plan of the locking-mechanism shown in Fig. 6. Fig. 8 is a detail of the locking device for the lever for shiftng the auxiliary front roller. Fig. 9 is a detail illustrating the locking-lever which shifts the auxiliary rear roller.

The invention is exemplified in a wheelbarrow which comprises a pair of main coaxial carrying-wheels 12 and a frame which is connected to the axle 13 for the wheels 12. The frame comprises a pair of longitudinal members 14, an integral curved front member 15 which rigidly cross-connects the front ends of members 14, a rear cross-member 16 and an intermediate cross-member 11. The longitudinal frame-members are extended rearwardly of member 16 to form handles 17. The longitudinal members comprise angular portions to which plates 19 are welded. The axle 13 for carrying-wheels 12 extends through plates 19 to support the frame so it can tilt vertically on the axis of wheels 12. The axle 13 is fixed and wheels 12 are suitably held against movement along the axle. A vertically extending structure rigid with the frame comprises upwardly convergent standards 21, the lowers ends of which are welded to the longitudinal frame-members 14. The upper ends of standards 21 are integrally connected by a rearwardly arched cross-member 22. Standards 21 are also secured by diagonal brace-members 23 to the longitudinal frame-members 14. Crossed braces 21a extend between the standards 21. The ends of the diagonal members 23 are welded to the members 21 and 14. All of the members of the frame are preferably formed of sections of tubing welded together to form a rigid supporting structure. The cross-member 11 is welded to the longitudinal members 14.

The vertical structure on the frame is located adjacent the front of the carrying-wheel 12. A support for carrying loads close to the ground is detachably connected to and projects from the front end of the frame. This support may be in the form of a platform or scoop provided with a bottom 25, side-flanges 26, and a rear flange 24. The platform is open at the front and terminates in a front edge 27 which can be tilted onto the ground. The platform is formed of sheet metal and is reinforced by bar 28. The bottom 25 is adapted to rest on the front curved cross-member 15 and the front portions of members 14 of the frame. This supporting platform or scoop is preferably detachably connected to the standards 21 by curved lugs 29 and screws 30 which are adapted to clamp against said standards. The inner sides of lugs 29 are open so that the lugs can be moved upwardly along the members 21 and off upwardly convergent standards 21. The platform or scoop is advantageously adapted for carrying heavy loads, such as tree-balls or stones. When the frame is tilted vertically to bring the front edge of the scoop against the ground, the loads can be pushed onto the scoop from the ground or from the scoop onto the ground with little manual effort. It is also possible to operate the platform as a shovel to pick-up the load. The links of a chain 31 are detachably connected to hooks 32 on standards 21 to retain a load, such as a tree-ball on the front platform in an inclined or nearly upright position. The trunk can be supported by the rearwardly arched member 22 of the vertical supporting structure.

The wheelbarrow comprises a holder or body 34 for retaining bulk material. This holder is adapted to rest on the top of the frame and is detachably held thereon. The front end of the holder 34 is provided with lugs 35 which are adapted to be secured to brace members 23 by screws 23'. The rear end of the holder is secured on the frame by screws 37 which extend through lugs 38 fixed on the holder. When the screws 23', 37 are turned to clear the frame members, the holder can be removed from the frame. This makes it possible to remove the holder from the wheelbarrow when it is desired to use only the front support.

The device for supporting the rear of the frame when desired comprises a bail 39 which has a cross-member and arms at its ends which are pivoted at 40 to the ends of the cross-member 11 of the frame. A pair of rollers 41 are journaled on the cross-member of bail 39 and are longitudinally aligned with the main carrying wheels 12. A rigid cross-member 42 connects the arms of bail 39. The bail 39 is pivoted to the frame so that the rollers 41 may be adjusted vertically to support the rear of the frame at different elevations or so they can be raised off the ground when it is desired to wheel the load on the main carrying-wheels 12. For this purpose, a lever 43 is pivoted to cross-member 42 of the bail 39 and extends through a slot 44 in a lug 45 which is fixed to the cross-member 16 of the frame. Dovetailed notches 46 are formed in the lower edge of lever 43 and are adapted to interlock with the lug 45 to secure the lever so it will lock the bail 39 to support the rear of the frame so the holder 34 is horizontal in a raised portion, as illustrated in Fig. 2, or entirely off the ground when it is desired to wheel the wheelbarrow solely on the carrying-wheels 12 and the front roller hereinafter described. Notches 46 are located so the bail 39 may also be locked in intermediate positions.

An auxiliary front roller 50 is provided to support a heavy load on the platform or scoop 25 and is longitudinally adjustable from a forward position, as illustrated in Fig. 6, beneath the platform to a rearward position, when it is desired to tilt the frame to bring the front edge 27 of the platform to the ground. This roller 50 is adjustable on a bar 51, the front end of which is welded to the member 15 of the frame and the rear end of which is fixed to a hanger 52 on the axle 13. Roller 50 is mounted on an axle 53, which is carried by a caster bracket 54 so the roller will permit the frame to be turned horizontally over the ground. Bracket 54 is pivoted to a plate 55 to swing horizontally. Plate 55 is slidable on the under side of bar 51 and is provided with upstanding studs 56 which extend through a slot 57 in bar 51. This slot is of sufficient length to permit the roller 50 to be shifted from a point beneath the central portion of the load-carrying platform or scoop, as illustrated by full lines in Fig. 2 to a rearward position illustrated by dotted lines in Figs. 2 and 6. In its forward position, the roller 50 is adapted to support the front end of the frame and the load-carrying platform from the ground and to permit the wheelbarrow to be wheeled around on the main carrying-wheels 12 and the roller 50. When the rollers 41 are lowered, the load may also be supported by said rollers while wheels 12 and roller 50 rest on the ground. When the roller 50 is shifted to its rearward position it will be positioned where it permits the frame to fulcrum thereon so the frame can be tilted to bring the front edge of the load-carrying platform to the ground. The rollers 41 may be locked to hold the frame in such tilted position. The bracket 54 permits roller 50 to caster in turning the wheelbarrow over the ground. A device is provided for shifting roller 50 between its forward and rearward positions and for locking it in its forward position when it is used in supporting the load on the front platform. This device comprises a latch 60 (Figs. 6 and 7) which is pivoted at 61 to one side of bar 51 and has its front edge 62 adapted to drop in the rear of plate 55 and lock it in its forward position. A lever 63, the handle of which is extended between the handle-member 17 of the frame, is adapted to shift the roller 50 and to release the latch 60. An angular releasing lever 64 is pivoted at 65 to a lug 66 which is fixed to slidable plate 55. One arm 67 of lever 64 is adapted to disengage latch 60 from the rear end of slidable plate 55. The front end of lever 63 is pivoted at 68 to the other arm of lever 64. Lever 63 extends through a slot 69 in a lug 70 (Fig. 8) on the cross member 16 of the frame and is provided with a tooth 71 whereby the lever 63 may be latched to hold the plate 55 in its rearward position. Lever 63 serves, through the lower arm of lever 64, to shift the slidable plate 55 between its forward and rearward positions. When the slidable plate 55 is locked in its forward position by latch 60, the arm 67 of lever 64 will be positioned below the latch. When it is desired to shift the plate 55 to its rearward position the operator will pull on the handle of lever 63, which will initially rock lever 64 and lift latch 60 to release plate 55 and continued rearward movement of the lever 63 will shift the lower arm of lever 64 to slide the plate 55 to its rearward position. When the plate 55 is in its rearward position, lever 63 can be locked by tooth 71 to hold plate 55, through lever 64, in its rearward position. When lever 63 is shifted to release its tooth 71 from lug 70, it can be pushed forwardly to shift the roller 50 to its forward position.

When it is desired to place a load on the front platform, roller 50 is shifted to its rearward position by a lever 63. The frame will then be free to tilt on the roller 50 and to lift the carrying-wheels 12 off the ground. The bail 39 can be adjusted so that rollers 41 will hold the frame tilted so the front edge of the platform will be close to or on the ground while the platform is being loaded. Loads, such as stones, may be pushed onto the platform or the wheelbarrow will be pushed to shovel the loads onto the platform. When a tree-ball is to be transported, it is pushed onto the scoop and the upper portion of the tree is moved backwardly between standards 21 into the rearwardly arched member 22 and secured therein by the chain 31. When the load has been placed on the platform, the bail 39 can be raised to lower the carrying-wheels 12 onto the ground. The load can be distributed between the carrying-wheels 12 and the rollers 50, 41. Rollers 41 may be left on the ground when the platform has been levelled, which is particularly desirable if the holder 34 also contains a heavy load. In planting trees, it is usually desirable to transport therewith bulk material such as fertilizer, filling earth or gravel. This material is placed in the holder 34. When it is desired to support the load entirely by the carrying-wheels 12, the rollers 41 will be raised off the ground and the roller 50 will be shifted to its rearward position. A slight depression of the handle 17 will then raise the roller 50 off the ground. The roller 50 is free to caster to facilitate the turning of the wheel. When the rollers 41 are lowered onto the ground and the carrying-wheels 12 also rest on the ground, the wheelbarrow will be supported at, at least, four points so that it will be supported to a substantial degree against transverse tilting. When roller 50 is in its forward position and additional leverage is desired in lifting the load on the platform off the ground, the frame can be tilted on said roller.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a wheelbarrow, the combination of a carrying-wheel, a frame supported to tilt vertically and extending longitudinally fore-and-aft of the wheel, handle-members on the frame, a load-carrying platform supported by the frame in the front of the wheel and near the ground and having an edge at its front end which is adapted to be tilted onto the ground, and means for detachably securing the platform on the front portion of the frame.

2. In a wheelbarrow, the combination of a wheel, a frame supported by the wheel to tilt vertically on the wheel-axis and extending longitudinally fore-and-aft of the wheel, handle-members on the rear of the frame, a front support detachably connected to and carried by the portion of the frame in front of the wheel, for carrying a load forwardly of the wheel and near the ground, and a holder for bulk material supported by, and detachably connected to, the frame and extending in part at least rearwardly of the wheel.

3. In a wheelbarrow, the combination of a pair of coaxial carrying-wheels, a frame supported to tilt vertically, comprising longitudinal members extending vertically and rearwardly of the wheel, and a standard secured to the longitudinal members and disposed adjacent the front of the wheel, a load-carrying support supported by the frame in front of the standard, a holder for bulk material supported by the frame rearwardly of the standard, a pair of rear rollers longitudinally aligned with the carrying-wheels, and means for vertically adjusting the rollers on the rear of the frame.

4. A wheelbarrow comprising a main carrying wheel, a frame extending longitudinally fore and aft of and supported by the carrying wheel to tilt vertically in front of and behind the wheel, handle members on the rear of the frame whereby the frame may be tilted vertically, a load carrying platform supported on the frame in front of the main carrying wheel and having an edge at its front end which is adapted to be tilted substantially to the ground, an auxiliary roller mounted on the frame for movement to a rearward position in which the frame and the platform can be tilted on the roller to bring the front edge of the support to the ground and to a forward position under the platform where it will coact with the main carrying wheel in supporting the frame and the support, and means for shifting the roller between said positions.

5. A wheelbarrow comprising a main carrying wheel, a frame extending longitudinally fore and aft of and supported by the carrying wheel to tilt vertically in front of and behind the wheel, handle members on the rear of the frame whereby the frame may be tilted vertically, a load carrying platform supported on the frame in front of the main carrying wheel and having an edge at its front end which is adapted to be tilted substantially to the ground, an auxiliary roller slidably mounted under the front portion of the frame for movement to a rearward position in which the frame and the platform can be tilted on the roller to bring the front edge of the support to the ground and to a forward position under the platform where it will coact with the main carrying wheel in supporting the frame and the support, and means for shifting the roller between said positions.

6. A wheelbarrow comprising a main carrying wheel, a frame extending longitudinally fore and aft of and supported by the carrying wheel to tilt vertically in front of and behind the wheel, handle members on the rear of the frame whereby the frame may be tilted vertically, a load carrying platform supported on the frame in front of the main carrying wheel and having an edge at its front end which is adapted to be tilted substantially to the ground, an auxiliary roller mounted on the frame for movement to a rearward position in which the frame and the platform can be tilted on the roller to bring the front edge of the support to the ground and to a forward position under the platform where it will coact with the main carrying wheel in supporting the frame and the support, and means comprising a lever adjacent the handle members for shifting the rollers between said positions.

7. A wheelbarrow comprising a main carrying wheel, a frame supported by the wheel to tilt vertically and extending longitudinally fore and aft of the wheel, handle members on the rear of the frame whereby the frame may be tilted, a front platform carried by the portion of the frame in front of the carrying wheel for carrying a load forwardly of the wheel and near the ground, means provided with a ground roller for supporting the rear of the frame so the wheelbarrow can be wheeled on the main carrying wheel and said roller and shiftable to hold the front of the platform tilted to the ground, and means comprising a lever for vertically adjusting the rear supporting means and the ground roller vertically relatively to the frame.

8. A wheelbarrow comprising a main carrying wheel, a frame supported by the wheel to tilt vertically and extending longitudinally fore and aft of the wheel, handle members on the rear of the frame whereby the frame may be tilted, a front platform carried by the portion of the frame in front of the carrying wheel for carrying a load forwardly of the wheel and near the ground, the frame being provided with means for supporting a holder for bulk material in part at least rearwardly of the wheel, means provided with a ground roller for supporting the rear of the frame so the wheelbarrow can be wheeled on the main carrying wheel and said roller and shiftable to hold the front of the platform tilted to the ground, and means comprising a rearwardly extending lever adjacent the handle members for vertically adjusting the rear supporting means and the ground roller vertically relatively to the frame.

JOSEPH W. DROLL.